Dec. 6, 1932.  A. H. NEULAND  1,890,015
MOTOR VEHICLE POWER AND TRANSMISSION APPARATUS
Filed Aug. 24, 1928
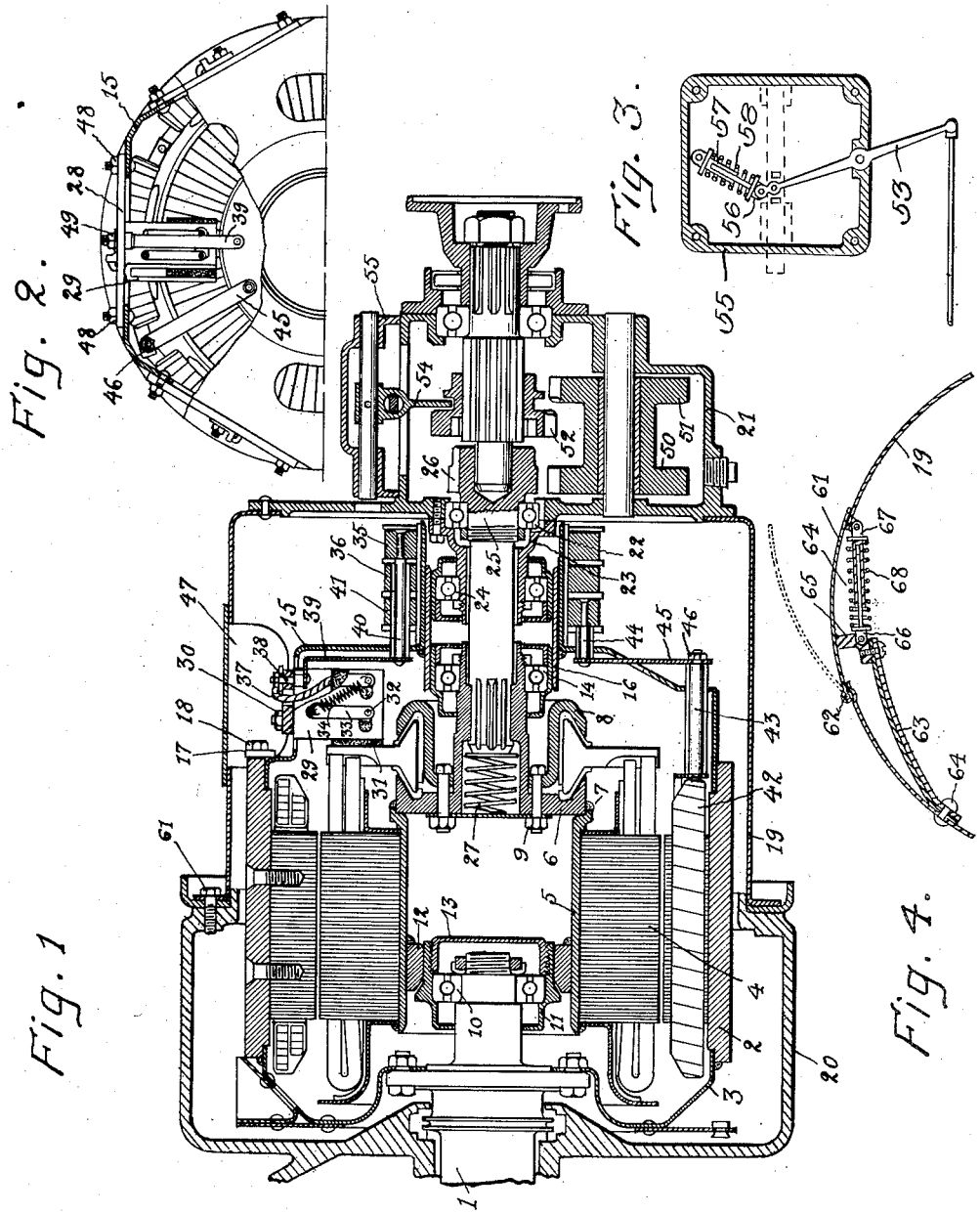
Inventor
Alfons Henry Neuland Patented Dec. 6, 1932

1,890,015

UNITED STATES PATENT OFFICE

ALFONS HENRY NEULAND, OF IRVINGTON, NEW JERSEY, ASSIGNOR, BY MESNE ASSIGNMENTS, TO ELECTROGEAR CORPORATION, A CORPORATION OF DELAWARE

MOTOR VEHICLE POWER AND TRANSMISSION APPARATUS

Application filed August 24, 1928. Serial No. 301,755.

My invention relates to electric transmission apparatus and particularly to such apparatus for use in motor vehicles.

In my copending application for patent Serial #295,879, filed July 28, 1928, patented Aug. 26, 1930, No. 1,773,844 for electric systems for vehicles, I have described a method for operating and controlling a transmission having clutch, booster and regulating dynamos cooperating with an internal combustion engine for driving a vehicle, it being the purpose of the present invention to provide improved apparatus and combinations of parts adapted, with an engine and a reversing gear, to form an improved unit power plant for vehicles.

An object of my invention is to provide for an axially short and compact electric unit secured by an improved corelation of parts and particularly by the arrangement of antifriction bearings within the armatures and other parts of the electrical units for the purpose of securing rigidity, preventing vibration and facilitating the installation of such a power plant in vehicles of moderate wheel base.

Another object is to provide a radial commutator for the clutch armature and radial rotating brush holders adapted for high speed operation, in which the centrifugal force does not materially affect the contact pressure, secured to the outer circumference of a special bracket and accessible for inspection or removal as a unit for replacement of brushes.

Another object is to maintain the lateral position of brushes and commutator during axial movements of the crank shaft to prevent movement of brushes in holders and the wear on brush mechanism.

Another object is to provide a semi-flexible driving member between the engine shaft and clutch field element to relieve the strain which any slight machining inaccuracy would otherwise imposed on the guide bearing at the other end.

Still another object is to provide for a simple and light weight construction, for easy disassembly of the clutch unit such as the removal of the reverse gear from the electric clutch as a unit, for mounting the brush rigging and slip rings on a common bracket for easy disconnection and removal from the clutch field system.

I attain these and still other objects by the mechanisms, parts and combinations illustrated in the accompanying drawing in which—

Fig. 1 is a vertical section of the clutch dynamo and reverse gear showing the method of attaching to rear of engine bell housing.

Fig. 2 is a detail of the brush and slip ring carrying bracket, partly cut away to show the manner of mounting the brush holders and securing the connectors from the slip rings.

Fig. 3 is a detail of the gear box cover, particularly showing the spring mechanism for holding sliding gear in forward or reverse engagement.

Fig. 4 is a detail of a cover plate, showing the method and mechanism for opening and closing it by changes in temperature.

Similar characters refer to similar parts throughout the several views.

Referring to Fig. 1, the rear end of the engine crank shaft 1 carries the field system and yoke 2 by means of the thin metal flange or disk 3 preferably made from pressed steel. The disk has great torsional rigidity to permit the mass in the field system to act as fly wheel for the engine and at the same time is capable of slight flexing in order to compensate for any slight misalignment of the bearing at the other end which may result from machining inaccuracies.

The armature 4 is assembled on a hollow cylinder or sleeve 5 and has a part 6 comprising the commutator shell secured to it as by welding at several points 7 around the circumference. The other part 8 of the commutator shell is preferably made from drawn steel, has bolts extending thru it and part 6 and nuts 9 to permit tightening of commutator from within the armature. The armature at one end is held in radial alignment with the field element by the ball bearing 10 having its inner race locked to an extension of the engine shaft and the outer race secured within a cup 11 which is slidably fitted either directly within the armature sleeve or in the ring 12 secured thereto. The cup is closed at the open end with a threaded flange 13 which serves to lock the outer race of bearing, and to provide a tight seal for the lubricant. When the armature rotates, the bearing cup 11 rotates with it and the centrifugal force throws the lubricant to the outer race of the bearing and prevents it from leaking or pumping out along the shaft and from damaging the electrical elements. Since the machine must be disassembled in order to fill the bearing reservoirs with the lubricant, this method of retaining the lubricant is of great importance as it prevents bearing failure and permits the apparatus to operate for considerable periods without servicing.

The other end of the armature is supported by the ball bearing 14 having its inner race locked to an annular extension or sleeve of the commutator shell 6, the outer race being secured within a similar cup for retaining lubricant above described and is supported by the brush bracket 15 of the field system which is preferably made from drawn steel and provided with a tubular extension 16 into which the cup of bearing 14 is slidably fitted. The bracket 15 is held against a shoulder in the field ring 2 by the lugs 17 and bolts 18. It is seen that the two bearings provide radial alignment for the armature within the field element and serve to maintain a uniform air gap therebetween.

A thin cylindrical casing 19, preferably made from drawn metal, is bolted to the engine bell housing 20 to which the gear box 21 is secured as by riveting. A ball bearing 22 is fitted into the left side of gear box, the outer race serving to concentrically align the flange 23 which is bolted to the gear box and provided with a hollow extension on which the inner race of another ball bearing 24 is locked. This bearing is also enclosed in a cup for retaining lubricant as heretofore described and has its cup fitted within the tube 16 of the bracket 15 and serves to rigidly guide and support the right end of the field element. The cups of bearings 14 and 24 revolve with the bracket 15 and the field system, the centrifugal force again serving to keep the lubricant within the bearing cups.

A shaft 25 is locked within the inner race of the gear box bearing 22 and has a pinion 26 integral with it protruding into the gear box, the other end of shaft being splined to fit the broached hole inside a portion of commutator shell 6. Within the remaining space of the hollow part 6 a spring 27 is provided operative to hold the armature against a stop on the bearing cup 11 and prevent axial movement of armature with respect to field element and to oppose axial movement of the crank shaft, without, however, interfering with the normal axial movement resulting from temperature changes. Furthermore this arrangement is conducive to quiet and vibrationless operation at high speed.

The brush holders consist of a bakelite plate 28, see Figs. 1 and 2, to which the metal U shaped holders 29 are secured as by rivets or the screws 30. The brushes 31 are slidingly fitted within the holders, and are provided with pins 32 which engage with the parallel metal links 33 hinged at their other end by pins thru the sides of the holder. The holders have openings at the bottom within which the pins move and hold the brushes in engagement with the commutator, the tension being supplied by a suitable spring such as the spring 34. It will be seen that the centrifugal force on the brush, as the field system rotates, acts at right angles to the movement of the brush and so does not interfere with the contact pressure supplied by the spring 34 permitting operation of the apparatus at high speed without excessive friction losses and without the danger of the brushes leaving the commutator. This brush construction further permits quiet operation of armature in reverse direction, as when the armature passes thru synchronism or from underspeeding to overspeeding the engine, especially when set at an angle of about 30° as plainly shown in Fig. 2, as the spring takes up any slack in the pins and links and thereby prevents brush vibration.

I further provide means for conducting current, which is very heavy at the start, to the slip rings 35 and 36. For this purpose each brush is provided with a shunt 37, attached to the top side of the brush and brought within the holder and at an angle toward the commutator thru openings in the metal holder and bakelite plate to the top thereof, the lug at the end of the shunt being secured to the stud 38 imbedded in the plate 28. The stud 38 is shouldered at the bottom and has one end of a metal radial strap connector 39 riveted to it, the other end being secured to a stud 40 which extends thru the rings 41 and 36, is insulated from them and riveted or otherwise secured to the ring 35. All brushes of like polarity are connected to the ring 35 and those of opposite polarity are similarly connected to ring 36. The field coils 42 are preferably connected for two circuits to permit connection with the studs 43 at opposite sides of the field ring in order to secure a natural balance. The slip rings 41 and 36 are provided with extra studs 44 to which the radial strap connectors 45 are riveted. The outer ends of connectors 45 are provided with holes and are firmly screwed against shoulders on the studs 43 with the nuts 46. The brush rigging, slip rings and connectors are thus made a part of the field bracket assembly which can easily be removed as a unit by unscrewing the bolts 18 and nuts 46. All radial connectors are firmly secured at their inner and outer ends, are spaced to have a natural balance and are well adapted to permit rotation at high speed. Furthermore the brush holders are accessible thru the hand hole 47 at the top of the casing and may be easily removed as units with the plates 28 for replacement of brushes by unscrewing the nuts 48, 48 and 49, the plate 28 slipping away from the stud 38.

I have not shown the slip ring brushes as they form no part of my invention and may be of any suitable type and secured to the sides or other parts of the casing.

In the operation of motor vehicles it is desirable to produce a reverse torque in excess of the forward torque. Inasmuch as an electric transmission of this character is incapable of producing such a reverse torque my invention provides for a gearing mechanism co-operating with the electric transmission for operating the vehicle in reverse direction. The gearing includes a double gear 50, 51 the gear 50 being driven by the pinion 26 thru an idling gear, not shown. The sliding gear 52 is adapted to be shifted by the lever 53 and the fork 54, see Fig. 3, and to clutch pinion 26 for forward operation and engage with gear 51 for reverse operation. Secured within the gear box cover 55 I provide a spring mechanism interposed between the end of lever 53 and side of cover, consisting of a flanged rod 56 pinned to the end of lever 53 and movably arranged within a flanged tube 57 loosely pinned to side of cover so that the spring 58 will apply a force to the lever 53. The spring mechanism permits engagement of gears without exercise of skill as the operator need only shift the lever 53 in either direction, and as it requires a little initial pressure to overcome the tension of spring 58, the lever, once it begins to move, will continue until the fork 54 reaches the stop on the other side. If it happens that the gears do not mesh the spring 58 will hold the gears in contact and the creepage produced by the idling engine upon armature and pinion 26 will immediately cause them to mesh. The force of spring 58 then completes and thereafter maintains the engagement.

It is of great importance in the disassembling of a combined electrical and mechanical transmission to keep the gear box grease from coming in contact with and injuring the electrical elements of the apparatus. My invention provides a construction which permits the removal of the entire gear box without opening it and so prevents the gear grease from spilling during assembly or disassembly. By unscrewing the bolts 61 and releasing the casing 19 from the bell housing 20, the entire gear assembly box 21 including the splined shaft 25 and bearing 24 with its enclosing cup may be removed as a unit, exposing the electric clutch and particularly enabling disconnection of the bracket assembly as heretofore described.

Electrical apparatus on vehicles directly connected to an engine is affected by the engine temperature and subjected to road dust which accumulates within the units to their detriment if they are continually open. My invention provides for cover plates 61 shown in Fig. 4 hinged to the casing at the point 62. A thermostat 63, composed of a plurality of strips of metal having unlike coefficients of expansion is attached to the casing with the rivet 64, the other end being secured to an arm 65 fastened to plate 61. As the temperature increases the thermostat 63 straightens out and tends to swing the cover to the position shown by the dotted line. I further provide a spring mechanism 64 similar to the one described in connection with the gear box, comprising the parts 66 and 67 arranged to slide one within the other and pivoted to the arm 65 and casing 19. The spring 68 pushes parts 66 and 67 apart, the pressure holding the cover plate 61 normally closed and resisting its opening by the thermostat 63 until a predetermined temperature is reached when the thermostat overcomes the spring tension and snaps the cover open, the spring mechanism 64 now holding the plates firmly open and resisting the closing by the thermostat until the temperature has dropped considerably, when again the thermostat overcomes the force of the spring mechanism and snaps the cover shut. One of these covers is attached to the side of the casing 19, not shown, for intaking air and a similar cover is attached to the bell housing 20 also not shown, for exhausting. With this arrangement the apparatus is kept free from road dust as the covers remain closed most of the time, the surrounding air being excluded, and is nevertheless protected from overheating by periodic opening of the covers and admission of the surrounding air when the load is unusually severe as on steep mountain grades or when the vehicle is operated in a hot climate.

While I have herein shown and described a complete apparatus and power plant embodying my invention as applied to a motor vehicle. I desire to have it understood that my invention is adapted to other uses and that it may be used in whole or in part in the described or other embodiments within the principle and scope of my invention.

Having now described my invention, what I claim and desire to secure by Letters Patent is:

1. In a combined power plant and transmission the combination of an engine, a rotatable clutch dynamo element having one end secured to the engine, a reverse gear box bolted to the engine, a bearing secured to the gear box for rotatively supporting the other end of the dynamo element, a rotor provided with a broached hole and journaled within the dynamo element, a load shaft journaled in the gear box, and a splined shaft extending from the gear box and slidingly engaging with the broached hole in the rotor for transmitting power therebetween.

2. In a combined power plant and transmission the combination of an engine, a rotatable dynamo element having one end secured to the engine, a reverse gear box bolted to the engine, a bearing secured to the gear box for rotatively supporting the other end of the dynamo element, a rotor provided with a broached hole and journaled within the dynamo element, a load shaft journaled in the gear box, a splined shaft extending from the gear box and slidingly engaging with the broached hole in the rotor, and a spring operative to resist axial movement between dynamo element and rotor.

3. In a combined power plant and transmission the combination of an engine, a rotatable field element having one end secured to the engine, a bracket secured to the other end of the field element and provided with a cylinder extending therefrom, an electric armature having a hollow center and a sleeve, an anti-friction bearing within the hollow center for journaling one end of armature, an anti-friction bearing on the sleeve for journaling the other end of armature, a gear box bolted to the engine, a load shaft journaled in the gear box, an anti-friction bearing carried by the gear box and disposed within the cylinder for rigidly supporting the field element, and a shaft also journaled in the gear box and slidingly engaging with the armature sleeve for transmitting power between the armature and the load shaft.

4. In an electric transmission, a rotatable field element, a brush adapted to rotate with the field element and subject to a centrifugal pressure, a brush holder for said brush, and a plurality of anti-friction compression members interposed between the brush holder and the brush adapted to reduce centrifugal friction between the brush and the brush holder and to permit movement of the brush with respect to the holder substantially at right angles to the centrifugal force acting on the brush.

5. In an electric transmission, a rotatable field element, a brush holder secured to the field element and adapted to rotate therewith, a brush for said brush holder subject to a centrifugal pressure, and a plurality of anti-friction compression members having their ends nearest the center of brush rotation bearing against the said brush and having their other ends bearing against the brush holder operative to reduce centrifugal friction between the brush and the brush holder and to permit free axial movement of the brush with respect to the holder substantially at right angles to the centrifugal force on the brush.

6. In an electric transmission, a rotatable field element having a field coil, a bracket for said field element, brushes and slip rings carried by said bracket, connectors between the slip rings and brushes, and means for connecting the field coil with one of the slip rings including a radial connector having one end attached to said slip ring and an axial connector having one end connected to the field coil adapted to facilitate removal of the bracket from the field element.

7. In a combined power plant and transmission, the combination of an engine, a load shaft, a rotatable dynamo element having one end secured to the engine, a gear box adapted to be secured to the engine including gearing connected with the load shaft and having driving means, a bearing for aligning the free end of the dynamo element with the gear box, a rotor aligned within the dynamo element having means to slidingly engage with the driving means when the gear box is joined with the engine operative to transmit power between the rotor and the gearing.

8. In an electric transmission, a rotatable field element, an armature having a radial commutator, a brush holder secured to and adapted to rotate with the field element, a brush facing the commutator and disposed within the brush holder subject to centrifugal pressure with respect to the brush holder, and anti-friction means for transferring the centrifugal pressure from a plurality of points on the brush to a plurality of points on the brush holder characterized in that said means reduces the centrifugal friction between the brush and the brush holder and maintains an unchanging angle between the brush face and axis of brush rotation during axial movement between the brush and the commutator.

9. In an electric transmission, a rotatable field element, an armature having a radial commutator, a bracket secured to the field element, a brush holder secured to and adapted to rotate with the field element, a brush facing the commutator and disposed within the brush holder subject to centrifugal pressure with respect to the brush holder, and anti-friction means for transferring the centrifugal pressure from the brush to the brush holder characterized in that said means maintains an unchanging angle between the brush face and axis of brush rotation during axial movement between brush and commutator.

10. In an electric transmission, a rotatable field element, a brush holder secured to and adapted to rotate with the field element, a brush disposed within said brush holder subject to centrifugal pressure by its rotation with the brush holder, and means for reducing the centrifugal friction between the brush and the holder including a plurality of parallel elements interposed between the brush and the brush holder operative to maintain an unchanging angle between brush face and axis of brush rotation during axial movement between brush and commutator.

11. In an electric transmission, a rotatable field element, an armature having a radial commutator, a bracket secured to the field element and provided with openings around its outer circumference, a plurality of brush holders adapted to be radially inserted thru the openings and to be secured to the bracket to bridge the openings, brushes for said commutator disposed within the brush holders and subject to centrifugal pressure, and means for reducing the centrifugal friction between brushes and brush holders characterized in that said means includes a plurality of anti-friction elements interposed between the brush and the brush holder operative to maintain an unchanging angle between the brush face and axis of brush rotation during axial movement between the brush and the commutator.

Signed at Newark in the county of Essex and State of New Jersey this 23rd day of August A. D. 1928.

ALFONS HENRY NEULAND.